United States Patent [19]

Kanda et al.

[11] 4,066,792

[45] Jan. 3, 1978

[54] METHOD OF PRODUCING SOYBEAN MILK YOGHURT

[75] Inventors: Hiroshi Kanda, Zushi, Japan; Hwa L. Wang; Clifford W. Hesseltine, both of Peoria, Ill.

[73] Assignee: The United States of America as represented by the Secretary of Agriculture, Washington, D.C.

[21] Appl. No.: 725,224

[22] Filed: Sept. 22, 1976

[51] Int. Cl.² .................... A23C 9/12; A23L 1/204
[52] U.S. Cl. .................................. 426/41; 426/43; 426/238; 426/583
[58] Field of Search ................ 426/46, 34, 43, 431, 426/583, 656, 41, 238

[56] References Cited

U.S. PATENT DOCUMENTS

| 3,096,177 | 7/1963 | Ariyama | 426/46 |
| 3,950,544 | 4/1976 | Fridman | 426/46 |
| 3,966,992 | 6/1976 | Banks et al. | 426/583 |

*Primary Examiner*—Joseph M. Golian
*Assistant Examiner*—R. A. Yoncoskie
*Attorney, Agent, or Firm*—M. Howard Silverstein; David G. McConnell

[57] ABSTRACT

An improved soybean milk yoghurt is prepared by first extracting a milk from soybeans. The milk is mixed with milk whey solids and sucrose and then sterilized. The hot milk is mixed with a dilute aqueous gelatin solution and rapidly cooled. A mixture, in approximately equal proportions, of two strains of *L. acidophilus*, namely, NRRL B-1910 and B-2092, is added to the milk, which is subsequently fermented to produce a yoghurt.

7 Claims, No Drawings

METHOD OF PRODUCING SOYBEAN MILK YOGHURT

BACKGROUND OF THE INVENTION

1. Field of the Invention

The invention is related to and has among its objects the provision of a novel method for producing yoghurt with improved properties from soybean milk. One object of the invention is to produce a soybean milk yoghurt having an improved flavor and texture. Another object is to produce a soybean milk yoghurt with reduced flatulence factors. Further objects of the invention will be evident from the following description wherein parts and percentages are by weight unless otherwise specified.

2. Description of the Prior Art

Soybeans, being rich in protein, have been recognized as an important food item, supplementing, or in some instances replacing, meat and dairy products. Several problems occur, however, in the use of soybeans as a food or food supplement. One important factor is that soybeans have an objectionable flavor, thus decreasing the palatability of foods prepared from soybeans. Furthermore, increased flatulence is associated with the consumption of food items containing soybean protein. Methods for preparing dairy products containing substantial amounts of soybean protein are known, but all of the known products either have poor flavor or are accompanied by flatulence when consumed or both. Another problem is that cultures and processes used in the dairy industry are often unsuited for soybean milk fermentation.

SUMMARY OF THE INVENTION

We have discovered a method for preparing a yoghurt having improved properties from soybean milk. In the process of the invention a milk is extracted ultrasonically from soybeans which have been treated by soaking in water and hot aqueous sodium bicarbonate. The soybean milk is mixed with small portions of milk whey solids and sucrose. The mixture is heated to sterilize it and is treated, while still hot, with a dilute sterilized aqueous gelatin solution. The so-treated milk is cooled rapidly to ambient temperature and inoculated with a mixture of two strains of *Lactobaccilus acidophilus*, NRRL B-1910 and NRRL B-2092, in approximately equal proportions. The inoculated material is then incubated and a yoghurt product is formed.

One of the advantages of the process of the invention is that the product has an excellent flavor and lacks the grassy, beany, rancid, and bitter taste associated with other fermented soybean products. The yoghurt of the invention may be enhanced additionally by incorporating therein such flavoring materials as vanilla, orange, strawberry, lemon, etc. Additional flavor components are extremely complementary to the natural flavor of the yoghurt of the invention.

Another advantage of the invention is that it yields a product containing substantially reduced amounts of flatulence factors. Thus, the discomfort associated with consuming soybean products is avoided by the process of the invention.

A further advantage of the invention is that a product having an excellent texture is obtained. The yoghurt of the invention has a very creamy texture unlike other known soybean milk yoghurts.

Another advantage of the process of the invention is that the yoghurt produced thereby is very stable. The yoghurt of the invention may be stored at 5° C. for a period of 19 days without any significant decrease in essential properties.

DESCRIPTION OF THE PREFERRED EMBODIMENTS

In the process of the invention a soybeam milk is first extracted from soybeans. To this end soybeans are soaked or immersed in water at a temperature of about 20°–30° C. for a period of about 8-24 hours. Best results are obtained by soaking the beans at 20° C. for 20 hours. Usually, about 3 to 5 parts of water are employed per part of soybeans. The soybeans are separated from the water, by draining or decanting off the water, and are treated with a dilute hot aqueous solution of sodium bicarbonate. Generally, the beans are immersed in the bicarbonate solution at a temperature of about 70°–100° C. for a period of 5-20 minutes, although optimum results are obtained by treating the beans with boiling (100° C.) bicarbonate solution for 5 minutes. Usually, the concentration of sodium bicarbonate in water is about 0.1–1.0%, preferably 0.2%. The amount of bicarbonate solution used is about 5-15 parts thereof per part of soybeans. Following the above treatment, the beans are separated from the bicarbonate solution and washed thoroughly with water.

After the beans have been soaked in water and treated with sodium bicarbonate, they are mixed with water in the proportion of 6-10 parts, usually 8 parts, of water per part of soybeans, on a dry weight basis. The mixture is subjected to blending action in a blendor, or some other suitable device, for a period of about 2-5 minutes, depending on the speed of the blendor. For most purposes blending for 2 minutes at high speed is sufficient.

The blended soybean slurry is then treated ultrasonically to extract a soybean milk therefrom. The slurry is subjected to a frequency sufficient to extract a milk therefrom, generally about 20 kilohertz (KHz) at output powers from 100-500 watts, in a sonicating apparatus (sonifier) for a period of 7-10 minutes with best results obtained with a time of 10 minutes. After sonication, the slurry is treated to separate a soybean milk liquid from the solid soybean residue. Centrifugation, filtration, or the like may be used for such purpose.

The so-produced soybean milk is mixed with a sweetening agent such as sucrose to reach a desired sweetness level. Usually, about 4–5% sucrose is sufficient. The sweetened milk is then mixed with milk whey solids in an amount of about 0–3%, preferably about 2%.

Next, the soybean milk is heated at a temperature of about 90°–121° C. to sterilize it. Usually, the milk is heated at 100° C. for a period of about 10-20 minutes.

The hot (about 100° C.) soybean milk is mixed with a sterilized dilute aqueous solution of gelatin until the concentration thereof in the milk is about 0.3-1.5%. The concentration of the gelatin solution will depend on the protein concentration in the soybean milk; the lower the protein concentration in the milk, the greater the concentration of gelatin in the aqueous solution. Usually, the soybean milk contains about 2.8 to 4.5% protein. The gelatin solution acts as a stabilizer to aid in preserving the improved properties of the instant yoghurt. Other stabilizing materials, for example, agar-agar, sodium alginate and other gums such as xanthan gum, may be employed in the process of the invention.

The hot milk is rapidly cooled to a temperature of about 30° to 35° C. The milk is inoculated with a mixture of two strains of *Lactobaccilus acidophilus* (*L. acdiophilus*), namely, NRRL B-1910 and NRRL B-2092. The ratio of B-1910 to B-2092 is important; only the proper ratio of the two strains will yield a yoghurt with the improved properties described hereinabove. Generally, the improved yoghurt of the invention is obtained by employing a mixture of strains in approximately a 1:1 ratio, i.e., one part of B-1910 to one part of B-2092. The amount of microorganism employed is related to the time necessary to complete the fermentation of the milk to a yoghurt. The greater the amount of added microorganism, the faster will be the production of yoghurt.

It is important to note that it is the conjunctive use of two different strains of the same microorganism which is responsible for the improved properties of the yoghurt of the invention. The use of only one of the two strains or the use of the two strains in improper proportions will not yield an improved yoghurt. It should be noted further that the conjunctive use of two strains of the same microorganism is not an obvious one. One skilled in the art would expect either of the two strains to produce the same result. To mix the two strains would be considered to be a useless procedure.

Following the inoculation, the agents are mixed thoroughly by stirring, shaking, or the like, and the milk is fermented. Generally, it is preferred to employ a temperature about 35°–40° C. for a period of about 16 to 24 hours. Basically, the fermentation should be conducted at a temperature and for a time sufficient to produce a yoghurt from the soybean milk. The time required to obtain this result depends on such factors as the amount of inoculum added, the temperature employed, etc.

It is within the compass of the invention to add one or more flavoring agents to the so-produced yoghurt. Thus, one may add such flavoring components as vanilla, strawberry, orange, lemon, and the like to the yoghurt product. Flavoring agents are extremely complementary to the flavor of the soybean milk yoghurt produced in accordance with the instant process. Also, the flavoring agents may be added, with equal success, to the soybean milk prior to its fermentation.

The strains of the microorganism used in the process of the invention are known and are on deposit in the Stock Culture Collection of the United States Department of Agriculture, Northern Region Research Laboratory, Peoria, Ill. 61604. The identification data are as follows: *Lactobaccilus acidophilus*, strains NRRL B-1910 and NRRL B-2092. Organization samples of these strains may be obtained from the above depository.

EXAMPLES

The invention is further demonstrated by the following illustrative examples.

EXAMPLE 1

Preparation of Soybean Milk

Soybeans (Hawkeys, 300 g.) were soaked in 1 l. of water for 16 hours at 20° C. and drained. The soaked beans were boiled in 3 l. of 0.2% aqueous sodium bicarbonate solution for 5 minutes, drained, washed with water, and again drained. The beans were mixed with 2 l. of water and blended in a Waring blendor at high speed for a period of 2 minutes.

The bean slurry was subjected to sonication for 10 minutes at a frequency of 20 KHz (kilohertz) using a Sonifier J-32A made by Branson Instruments, Inc. After sonication, the slurry was centrifuged at 3,000 rpm for 5 minutes, yielding 1.5 l. of soybean molk (3.6% protein content by the Kjeldahl method).

EXAMPLE 2

Preparation of Mixed Culture of B-1910 and B-2092

Soybean milk (200 ml.) produced as described in Example 1 was enriched with 4 g. of cheese whey powder and 10 g. of sucrose. The enriched soybean milk was divided into 5- and 25-ml. portions and transferred to test tubes and small Erlenmeyer flasks, respectively. The tubes and flasks, with contents, were sterilized at 121° C. for 10 minutes and cooled to ambient temperature. A 0.1-ml. portion of B-1910, from the NRRL stock culture in deep liver broth, was added to one of the above test tubes. A similar portion of B-2092 was added to another of the above test tubes. The inoculated test tubes were incubated at 37° C. for 24 hours. One ml. of each culture from the test tubes was transferred, respectively, to one each of the above Erlenmeyer flasks containing 25 ml. of soybean milk. The flasks and contents were incubated at 37° C. for 24 hours. The so-prepared cultures were then mixed in equal proportions.

The above description is merely exemplary of a method for preparing the mixed culture for use in the process of the invention and is not meant as a limitation. Other methods may work and parameters may be adjusted without departing from the scope of the invention.

EXAMPLE 3

Preparation of Soybean Milk Yoghurt

Cheese whey powder (20 g.) and sucrose (50 g.) were mixed with 1 l. of soybean milk prepared as in Example 1. Portions (250 ml.) of the enriched milk were transferred to 1-liter Erlenmeyer flasks, which were covered with cotton plugs and steamed at 100° C. for 20 minutes. To the hot milk in each flask was added 6 ml. of a 20% sterile aqueous gelatin solution. The mixture was cooled rapidly to ambient temperature and 12.5 ml. of the mixed culture prepared in Example 2 was added to each flask. The inoculated soybean milk was mixed thoroughly and incubated at 37° C. for 24 hours.

The so-produced yoghurt had a pH of 4.2, a titratable acid content of 0.71% (as lactic acid) and a viable bacterial count of $9 \times 10^8$ per g. of yoghurt. No significant change in these values was observed after storing the yoghurt at 5° C. for 19 days.

The above-prepared yoghurt exhibited very good taste and odor qualities as determined by a panel of judges trained in yoghurt tasting.

EXAMPLE 4

Preparation of Flavored Soybean Milk Yoghurt

The procedure outlined in Example 3 was followed with the following changes: Before addition of the mixed culture from Example 2 to the milk, 1.3 ml. of lemon extract was added to one flask containing 250 ml. of soybean milk. To another such flask was added 2.0 ml. of strawberry extract.

The flavored products exhibited excellent taste and odor qualities as determined by a panel composed of judges trained in yoghurt tasting.

Having thus described our invention, we claim:

1. A process for preparing yoghurt from soybeans, comprising the steps of a. extracting a soybean milk ultrasonically from soybeans that have been treated by soaking in water and hot aqueous sodium bicarbonate,
b. mixing the soybean milk with milk whey solids in an effective amount up to about 3% and sucrose in an amount sufficient to sweeten the soybean milk,
c. heating the soybean milk at a temperature of about 90°–121° C. for a period of 10–20 minutes,
d. mixing the hot soybean milk with a sterilized solution of a stabilizer in an amount sufficient to stabilize the soybean milk,
e. cooling said hot stabilized milk rapidly to a temperature of about 30°–35° C.,
f. inoculating said cooled milk with a mixture of *L. acidophilus* NRRL B-1910 and *L. acidophilus* NRRL B-2092 in approximately equal proportions, and
g. fermenting the so-inoculated milk to produce a yoghurt therefrom.

2. The process of claim 1 wherein the soybean milk is prepared by a procedure comprising the steps of
a. soaking soybeans in water at a temperature of about 20°–30° C. for a period of about 8–24 hours,
b. treating the so-soaked beans with a 0.1–1.0% aqueous solution of sodium bicarbonate at a temperature of about 70°–100° C. for a period of about 5–20 minutes,
c. mixing the so-treated beans with water and blending the mixture to produce a slurry,
d. sonicating the slurry at a frequency and for a time sufficient to extract a milk therefrom, and
e. separating a milk from the slurry.

3. The process of claim 2 wherein the beans in Step c are mixed with water in the proportion of 6 to 10 parts of water to one part of beans, on a dry weight basis.

4. The process of claim 2 wherein the bean-water mixture in Step c is blended for a period of 2 minutes.

5. The process of claim 2 wherein the slurry in Step d is sonicated at a frequency of 20 kilohertz for a period of 7–10 minutes.

6. The process of claim 1 wherein the stabilizer is a dilute aqueous gelatin solution and its concentration in the soybean milk after addition thereto is 0.3–1.5%.

7. The process of claim 1 wherein the inoculated milk is fermented in Step g by incubating it at a temperature of about 35°–40° C. for a period of about 16 to 24 hours.

* * * * *